(12) United States Patent
Koech et al.

(10) Patent No.: US 10,434,460 B2
(45) Date of Patent: *Oct. 8, 2019

(54) CAPTURE AND RELEASE OF ACID GASSES USING TUNABLE ORGANIC SOLVENTS WITH AMINOPYRIDINE

(71) Applicant: BATTELLE MEMORIAL INSTITUTE, Richland, WA (US)

(72) Inventors: Phillip K. Koech, Richland, WA (US); Deepika Malhotra, Richland, WA (US); David J. Heldebrant, Richland, WA (US); Vassiliki-Alexandra Glezakou, Richland, WA (US); Roger J. Rousseau, Richland, WA (US); David C. Cantu, Reno, NV (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,104

(22) Filed: Oct. 5, 2018

(65) Prior Publication Data

US 2019/0039014 A1 Feb. 7, 2019

Related U.S. Application Data

(62) Division of application No. 15/410,523, filed on Jan. 19, 2017, now Pat. No. 10,130,907.
(Continued)

(51) Int. Cl.
*B01D 53/40* (2006.01)
*B01D 53/48* (2006.01)
(Continued)

(52) U.S. Cl.
CPC ..... *B01D 53/1425* (2013.01); *B01D 53/1456* (2013.01); *B01D 53/1493* (2013.01);
(Continued)

(58) Field of Classification Search
None
See application file for complete search history.

(56) References Cited

U.S. PATENT DOCUMENTS 3,161,461 A 12/1964 Deal, Jr. et al.
3,725,537 A 4/1973 Schulze et al.
(Continued)

FOREIGN PATENT DOCUMENTS

CA 2539418 A1 9/2007
GB 2079307 A 1/1982
(Continued)

OTHER PUBLICATIONS

Bergstrom et al., "The Use of the Fused Eutectic of Sodium Amide and Potassium Amide in Organic Syntheses." J. Org. Chem., 1946, vol. 11 (3), pp. 239-246.*

(Continued)

*Primary Examiner* — Daniel Berns
(74) *Attorney, Agent, or Firm* — Derek H. Maughan (57) ABSTRACT

A class of water lean, organic solvents that can bind with various acid gasses to form acid gas bound molecules having a high degree of intramolecular hydrogen bonding which enables their use as regenerable solvents for acid gas capture. Unlike the other devices described in the prior art, the present invention takes advantage of shortened distances between the portions of the molecule that form hydrogen bonds within the structures when loaded with an acid gas so as to create a molecule with a higher internal bonding affinity and a reduced proclivity for agglomeration with other molecules.

2 Claims, 4 Drawing Sheets

Related U.S. Application Data (60) Provisional application No. 62/421,416, filed on Nov. 14, 2016, provisional application No. 62/281,053, filed on Jan. 20, 2016.

(51) Int. Cl.
```
B01D 53/50      (2006.01)
B01D 53/52      (2006.01)
B01D 53/62      (2006.01)
B01D 53/74      (2006.01)
B01D 53/96      (2006.01)
B01D 53/14      (2006.01)
C07D 213/28     (2006.01)
C07D 213/36     (2006.01)
C07D 213/38     (2006.01)
C07D 213/60     (2006.01)
C07D 213/62     (2006.01)
C07D 213/63     (2006.01)
C07D 213/64     (2006.01)
C07D 213/65     (2006.01)
C07D 213/68     (2006.01)
C07D 213/72     (2006.01)
C07D 213/73     (2006.01)
C07D 213/74     (2006.01)
```
(52) U.S. Cl.
CPC ........... *B01D 2252/2041* (2013.01); *B01D 2252/20426* (2013.01); *B01D 2252/20431* (2013.01); *B01D 2252/20457* (2013.01); *B01D 2257/302* (2013.01); *B01D 2257/308* (2013.01); *B01D 2257/504* (2013.01)

(56) References Cited

U.S. PATENT DOCUMENTS

| | | |
|---|---|---|
| 4,113,849 A | 9/1978 | Atwood |
| 4,137,294 A | 1/1979 | Braizler et al. |
| 4,238,206 A | 12/1980 | Hong |
| 4,545,964 A | 10/1985 | Bergez et al. |
| 4,545,965 A | 10/1985 | Gazzi et al. |
| 4,959,086 A | 9/1990 | Van Baar et al. |
| 5,017,347 A | 5/1991 | Epperly et al. |
| 5,170,727 A | 12/1992 | Nielsen |
| 5,347,003 A | 9/1994 | Trauffer et al. |
| 5,366,709 A | 11/1994 | Peytavy et al. |
| 6,036,931 A | 3/2000 | Yoshida et al. |
| 6,071,484 A | 6/2000 | Dingman, Jr. et al. |
| 7,459,134 B2 | 12/2008 | Cadours et al. |
| 7,718,151 B1 | 5/2010 | Hu |
| 7,799,299 B2 | 9/2010 | Heldebrant et al. |
| 8,652,237 B2 | 2/2014 | Heldebrant et al. |
| 8,691,171 B2 | 4/2014 | Katz et al. |
| 10,130,907 B2* | 11/2018 | Koech ............... B01D 53/1425 |
| 2003/0047309 A1 | 3/2003 | Thomas et al. |
| 2004/0118749 A1 | 6/2004 | Lesemann et al. |
| 2005/0113450 A1 | 5/2005 | Thorarensen et al. |
| 2005/0227959 A1 | 10/2005 | Yoshida et al. |
| 2005/0234044 A1 | 10/2005 | Gronenberg et al. |
| 2006/0004025 A1 | 1/2006 | Brookings et al. |
| 2007/0021382 A1 | 1/2007 | Asaaf et al. |
| 2007/0255064 A1 | 11/2007 | Szarvas et al. |
| 2008/0058549 A1 | 3/2008 | Jessop et al. |
| 2008/0112866 A1 | 5/2008 | Davis |
| 2008/0197084 A1 | 8/2008 | Jessop |
| 2009/0136402 A1 | 5/2009 | Heldebrant et al. |
| 2009/0220397 A1 | 9/2009 | Heldebrant et al. |
| 2010/0319540 A1 | 12/2010 | Garcia Andarcia et al. |
| 2012/0063979 A1 | 3/2012 | Kortunov et al. |
| 2012/0294785 A1* | 11/2012 | Murai ............... B01D 53/1475 423/210 |

FOREIGN PATENT DOCUMENTS

| | | |
|---|---|---|
| JP | 2003261315 A | 6/2003 |
| WO | 1986005474 A1 | 9/1986 |
| WO | 2008068411 A2 | 6/2008 |
| WO | 2008122030 A2 | 10/2008 |
| WO | 2009097317 A2 | 8/2009 |
| WO | 2010039479 A1 | 4/2010 |
| WO | 2012082203 A1 | 6/2012 |

OTHER PUBLICATIONS

Barzagli, F., et al., A New Class of Single-Component Absorbents for Reversible Carbon Dioxide Capture under Mild Conditions, ChemSusChem, 8, 2015, 184-191.
Barzagli, F., et al., Improved Solvent Formulations for Efficient CO2 Absorption and Low-Temperature Desorption, ChemSusChem, 5, 2012, 1724-1731.
Barzagli, F., et al., Efficient CO2 Absorption and Low Temperature Desorption With Non-Aqueous Solvents Based on 2-Amino-2-Methyl-1-Propanol (AMP, International Journal of Greenhouse Gas Control, 16, 2013, 217-223.
Bates, E. D., et al., CO2 Capture by a Task-Specific Ionic Liquid, J Am Chem Soc, 124, 6, 2002, 926-927.
Blasucci, V., et al., Single Component, Reversible Ionic Liquids for Energy Applications, Fuel, 89, 2010, 1315-1319.
Gurkan, B. E., et al., Equimolar CO2 Absorption by Anion-Functionalized Ionic Liquids, J Am Chem Soc, 132, 2010, 2116-2117.
Halliday, J. D., et al., The Reaction of Trimethylamine in Liquid Hydrogen Sulphide: An Electrical Conductivity Study, AECL, 7999, 1982, 1142-1145.
Heldebrant, D. J., et al., A Reversible Zwitterionic SO2-Binding Organic Liquid, Engery Environ Sci, 3, 2010, 111-113.
Heldebrant, D. J., et al, Reversible Uptake of COS, CS2, and SO2: Ionic Liquids With O-Alkylxanthate O-Alkylthiocarbonyl, and O-Alkylsultite Anions, Chem Eur J, 15, 2008, 7619-7627.
Heldebrant, D. J., et al., CO2-Binding Organic Liquids (CO2BOLs) for Post-Combustion CO2 Capture, Energy Procedia, 1, 2009, 1187-1195.
Huang, J., et al., Tuning Ionic Liquids for High Gas Solubility and Reversible Gas Sorption, Journal of Molecular Catalysis A: Chemical, 279, 2008, 170-176.
Jou, F-Y., et al., Solubility of Methane in Methyldiethanolamine, J Chem Eng Data, 51, 2006, 1429-1430.
Kidnay, A. J., et al., Fundamentals of Natural Gas Processing, CRC Press Taylor & Francis Group, 2006, 100-113.
Koech, P. K., et al., Chemically Selective Gas Sweetening Without Thermal-Swing Regeneration, Energy Environ Sci, 4, 2011, 1385-1390.
Liu, Y., et al., Switchable Surfactants, Science, 313, 2006, 958-960.
Maddox, R. N., et al., Reactions of Carbon Dioxide and Hydrogen Sulfide With Some Alkanolamines, Ind Eng Chem Res, 26, 1987, 27-31.
McDaniel, D. H., et al., Strong Hydrogen Bonds. III. Hydrogen Sulfide-Hydrosulfide Anion Interactions, Inorganic Chemistry, 5, 12, 1966, 2180-2181.
Phan, L., et al., Switchable Solvents Consisting of Amidine/Alcohol or Guanidine/Alcohol Mixtures, Ind Eng Chem Res, 47, 2008, 539-545.
Siqueira, L. J. A., et al., Shielding of Ionic Interactions by Sulfur Dioxide in an Ionic Liquid, J Phys Chem B, 112, 2008, 6430-6435.
Switzer, J. R., et al., Reversible Ionic Liquid Stabilized Carbamic Acids: A Pathway Toward Enhanced CO2 Capture, Ind Eng Chem Res, 52, 2013, 13159-13163.
Wang, C., et al., Reversible and Robust CO2 Capture by Equimolar Task-Specific Ionic Liquid-Superbase Mixtures, Green Chem, 12, 2010, 870-874.
Wu, W., et al, Desulfurization of Flue Gas: SO2 Absorption by an Ionic Liquid, Agnew Chem Int Ed, 43, 2004, 2415-2417.
Jessop, P. G., et al., Reversible Nonpolar-to-Polar Solvent, Nature, 436, 2005, 1102.

(56) References Cited

OTHER PUBLICATIONS

Invitation to Pay Additional Fees and, Where Applicable, Protest Fee for International Application No. PCT/US2009/032208, International Filing Date Jan. 28, 2009, dated Jun. 3, 2009.
Notification of Transmittal of the International Search Report and the Written Opinion of the International Searching Authority, or the Declaration for International Application No. PCT/US2011/041875, International Filing Date Jun. 24, 2011, dated Nov. 28, 2011.
Notification of Transmittal of the International Search Report and the Written Opinion of the International Searching Authority, or the Declaration for International Application No. PCTU/US2011/052602, International Filing Date Sep. 21, 2011, dated Jan. 25, 2012.
English Abstract for Publication No. JP 2003261315, Publication Date Sep. 16, 2003.
The Distillation Group, Inc., Distillation, Jan. 11, 2001, The Distillation Group, Inc. Retrieved from internet Aug. 27, 2013, 5-6.
Office Action for U.S. Appl. No. 15/410,523, filed Jan. 19, 2017, Notification dated Feb. 1, 2018.
Final Office Action for U.S. Appl. No. 15/410,523, filed Jan. 19, 2017, Notification dated Aug. 8, 2018.

\* cited by examiner

CAPTURE AND RELEASE OF ACID GASSES USING TUNABLE ORGANIC SOLVENTS WITH AMINOPYRIDINE

PRIORITY

This invention claims priority from and is a Divisional of U.S. patent application Ser. No. 15/410,523 entitled Capture And Release Of Acid Gasses Using Tunable Organic Solvents With Aminopyridine filed Jan. 19, 2017, which claims priority from provisional patent application No. 62/281,053 entitled System and Process for Tunable Organic Solvents for Selective Capture of $CO_2$ filed Jan. 20, 2016, and from provisional patent application No. 62/421,416 entitled Capture and Release of Acid Gasses Using Tunable Organic Solvents with Aminopyridine filed Nov. 14, 2016, the contents of all which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE INVENTION

Field of the Invention

The invention generally relates to acid gas capture and more particularly to reversible acid gas capture systems and processes.

Background Information

The release of greenhouse and acid gases into the air produces local and global effects on the environment. The combustion of fossil fuels generates acid gases such as carbon dioxide ($CO_2$), sulfur oxides ($SO_2$ and COS), sulfides ($H_2S$) and nitrogen oxides (NOx). Fixed combustion sources, such as coal burning power plants, generate significant acid gas emissions released in their flue gas. The capture and removal of the acid gases including carbon dioxide ($CO_2$), sulfur oxides ($SO_2$, $SO_3$, COS, $CS_2$), hydrogen sulfide ($H_2S$), and nitrogen oxides (NOx) from flue gas will become an even greater issue as coal becomes more prominent in the world's future energy consumption. The capture of significant amounts of greenhouse and acid gases from emission sources is desired to reduce the environmental effects of these sources.

Current aqueous flue gas scrubbing technologies are typically too energy intensive to be used industrially or often require the use of toxic materials which further complicates implementation. Various current aqueous scrubbing technologies remove sulfur oxides and nitrogen oxides from flue gas, and trap these acid gases as basic salts of their acid gases (thiocarbonates, dithiocarbonates, sulfites and nitrate) using a highly basic solution of caustic soda or lime. In these examples the binding is stoichiometric and irreversible and results in a base that cannot be reused.

Various binding organic liquid (BOLs) acid gas capture strategies such as those developed by Phillip Jessop, David Heldebrant, Philip Koech and others are described in various applications and patents such as U.S. Pat. No. 7,700,299. These technologies are a significant improvement over the prior art and have shown great promise in providing a solution to these problems. However, in some circumstances, these binding organic liquids can be limited by problems related to an increase in viscosity with $CO_2$ loading which impacts the ability of these materials to be pumped and transferred from one location to another, and has created various problems related to their scaling up and broader utilization. What is needed is a form of binding organic liquid that remains in a less viscous state when bound with the acid gas so as to allow pumping and transportation of the liquid sorbents from one location to another. What is also needed is a process for tuning binding organic liquids so as to retain a desired low viscosity or other features. What is also needed is a form of a binding organic liquid that retains a desired level of viscosity and also allows for facile release of acid gasses and regeneration of the sorbent material. The present invention meets these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present application includes a description of a class of water lean, organic solvents that can bind with various acid gasses to form structures having a high degree of intramolecular (internal) hydrogen bonding when bound to their acid gas which enables their use as regenerable solvents for acid gas capture. Unlike the other devices described in the prior art, the present invention takes advantage of shortened distances between the portions of the molecule that form hydrogen bonds within the structures when loaded with an acid gas so as to create a molecule with a higher internal bonding affinity and a reduced proclivity for agglomeration with other molecules.

In one set of embodiments, results of various modified $CO_2$ binding organic liquids ($CO_2$BOLs) are described with various designs for tuning such materials to effectuate acid gas capture, with charge neutrality in the resulting bound materials so as to impart desired characteristics such as lowered levels of viscosity to the resulting bound materials.

In another set of embodiments, water-lean non-aqueous amine-based solvents that form zwitterionic carbamates for acid gas capture are described. In another set of embodiments, example structures of various of these materials including various types of amino pyridines are shown as are acid gas capture methods and processes that utilize these materials.

In one set of embodiments, the invention may include a method for tuning the viscosity of a binding organic liquid comprising the step of adjusting the structure of the acid gas capture molecule by modifying the internal hydrogen bonding distances within the structure to produce a neutral acid gas capture material with a reduced proclivity for agglomeration with other molecules and a resulting lowered viscosity. In some instances this distance between such hydrogen bonded portions may be less than about 2 angstroms. In another embodiment of the invention an acid gas capture material may have a binding organic liquid with a structure that binds to an acid gas and results in a charge neutral molecule. In another set of embodiments a gas-selective capture sorbent for capture and chemical binding of an acid gas is described having an amino pyridine that reversibly binds an acid gas under a first set of conditions and releases that acid gas under a second set of conditions. The amino pyridine, or other heteroaromatic compounds such as triazines, pyrimidines, or imidazoles in such a sorbent may have any of a variety of features including being a primary or secondary amino pyridine; having at least one R group with a carbon number selected from C1 to C18; having an R group selected from the group consisting of methyl, ethyl, propyl, iso-propyl, butyl, iso-butyl, aryl, and combinations thereof; or having a least one R group that is an alkyl amine or a dialkyl amine. In some embodiments the amino pyridine may be selected from the group of 2-[(methylamino)methyl] pyridine (2-MAMP), 3-[(methylamino)methyl]pyridine (3-MAMP), 4-[(methylamino)methyl]pyridine (4-MAMP), 2-[(ethylamino)methyl]pyridine (2-EAMP), 4-[(ethylamino)methyl]pyridine (4-EAMP) and 2-[(methylamino) ethyl]pyridine (2-MAEP); and derivatives and combinations thereof. In some embodiments the capture solvent may retain a viscosity at or below about 300 cP at a maximum loading of acid gas at temperature at or below 40° C. therein.

In other embodiments, these amino pyridine solvents transform from liquids to solid upon $CO_2$ capture. The resultant solid can be separated from the liquids in order to intensify the $CO_2$-rich materials thus saving energy of regeneration by thermal heating of less material. In one set of experiments these solid $CO_2$-rich materials were regenerated at 120° C. to form the liquid sorbent.

In another set of embodiments the amino pyridine has the structure:

wherein at least one of the R groups includes an alkyl amine or a dialkyl amine. In addition, in this embodiment, at least one of the R groups may be selected from the group consisting of Me, Et, Pr, iPr, Bu, iBu, t-Bu, cyclobutyl, cyclopentyl, and cyclohexyl. In some embodiments, R1 and R2 may each include a hetero-alkyl group selected from OMe, OEt, OPr, OBu, Ot-Bu, $N(Me)_2$, and $N(Et)_2$. In some applications the capture solvent may comprise up to about 10% water by weight. In other applications the methylene repeat units (n) can be any number up to 100 (n≤100).

In another application of the invention an embodiment is described which is a method for capturing an acid gas from a stream. The method includes the step of contacting the stream with a gas selective capture sorbent having an amino pyridine that reversibly binds the acid gas under a first set of conditions to form a bound solvent, and releases the acid gas under a second set of conditions to release the bound solvent and regenerate the sorbent. In some applications, this process includes moving the bound solvent to another location and exposing the bound sorbent to a second set of conditions. In some applications, the amino pyridine sorbent is a liquid. The acid gas may be $CO_2$, $SO_2$, COS, $CS_2$, $H_2S$, and combinations thereof. The second set of conditions may include heating the bound solvent to a temperature between from 70° C. to 100° C., shifting polarity of the sorbent from neutral form to the non-polar amino pyridine form, or separating solid phase zwitterionic carbamate salts or analogues thereof formed in the sorbent from a liquid phase comprising gas-lean amino pyridines therein to at least partially regenerate the sorbent.

In some of these embodiments, the capture solvent may include using a gas-selective capture solvent having an amino pyridine that reversibly binds an acid gas under a first set of conditions and releases that acid gas under a second set of conditions. The amino pyridine in such a sorbent may have any of a variety of features including being a secondary amino pyridine; having at least one R group with a carbon number selected from C1 to C18; having an R group selected from the group consisting of methyl, ethyl, propyl, iso-propyl, butyl, iso-butyl, aryl, and combinations thereof; or having a least one R group that is an alkyl amine or a dialkyl amine. In some embodiments the amino pyridine may be selected from the group of 2-MAMP; 3-MAMP; 4-MAMP; 2-EAMP; 4-EAMP; 2-MAEP; and derivatives and combinations thereof. In some embodiments the capture solvent may retain a viscosity at or below about 300 cP at a maximum loading of acid gas therein. In another set of embodiments, the sorbents contain other heteroaromatic bases that can be used to bind with acid gasses and create similar sorbents as aminopyridines. Examples of such structures include aminopyrazines, aminopyrimidines, aminopyrazines, aminoindoles, aminoimidazoles, aminotriazoles, aminotriazines, and other similar structures. An example of such a structure designed for $CO_2$ capture has the structure:

Het= Pyridine, Pyridazine, Pyrimidine, pyrazine, indole, Imidazole, triazole and triazine wherein at least one of the R groups includes an alkyl amine or a dialkyl amine. In addition, in this embodiment, at least one of the R-groups may be selected from the group consisting of Me, Et, Pr, iPr, Bu, iBu, t-Bu, cyclobutyl, cyclopentyl, and cyclohexyl. In some embodiments, R1 and R2 may each include a hetero-alkyl group selected from OMe, OEt, OPr, OBu, Ot-Bu, $N(Me)_2$, and $N(Et)_2$. In some embodiments, the heteroaromatic rings consist of at least one nitrogen atom such as pyrazine, pyridazine, pyrimidine, indole, imidazole, benzimidazole, triazole and triazine. In some applications the capture solvent may comprise up to about 10% water by weight.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

The following description includes various embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

The present detailed description includes various modified $CO_2$ binding organic liquids ($CO_2$BOLs) and various designs for tuning such materials to effectuate acid gas capture while imparting desired characteristics such as lowered levels of viscosity to the resulting bound materials. While these embodiments are shown and described in the context of $CO_2$, it is to be understood that the invention is not limited thereto but includes other acid gasses as well. In one set of embodiments, water-lean non-aqueous amine-based solvents that form zwitterionic carbamates for acid gas capture are described. In another set of embodiments examples structures of various materials including various types of amino pyridines are shown as are acid gas capture methods and processes that utilize these materials.

In one typical application and usage, the present invention includes a series of water lean or non-aqueous sorbents that are able to bind acid gasses such as $CO_2$, $SO_2$, COS, $CS_2$, etc. at standard temperature and pressures (STP) to form liquid carbamate salts with a generally high gravimetric capacity (~20 wt %) but retain a desired level of viscosity. As such the bound sorbents may be pumped or transferred from one location to another which enables the acid gas in one location to be captured under a first set of process conditions and then moved to another location where the acid gas can be removed by subjecting the bound material to a second set of conditions and ideally the sorbent regenerated for later use. Stripping of these acid gasses and regeneration of the underlying sorbent can take place when conditions, such as temperature, pressure or other stimuli are altered. This enables a cyclical process to take place wherein acid gasses are captured, bound, and then subsequently released with these binding materials recycled for reuse.

The solvents described in the present application have low thermal regeneration temperatures (70-100° C.) and low $CO_2$-rich solvent viscosity compared to other water-lean materials. The regeneration temperature can be lowered further to 60° C. by applying polarity swing assisted regeneration (PSAR) making it feasible to utilize lower grade heat from the power plant for acid gas stripping resulting in energy savings. While others have utilized aqueous acid gas capture technologies made up of primary and secondary alkanol amines such as monoethanolamine (MEA) or diethanolamine (DEA) in water for chemical absorption of acid gas capture materials like $CO_2$, high regeneration temperatures (>120° C.), high steel corrosion due to the water load, and thermal degradation render these types of materials undesirable. In addition, most of these other solvents when amine-based require a co-solvent such as water or an added organic to dissolve the carbamate salt. The present embodiments which are amine-based operate in much less harsh (milder) conditions and do not require a co-solvent to dissolve the $CO_2$ carrier to enable processing.

In one set of embodiments principles and methods for the tunability of acid gas capture binding organic liquids for acid gas capture such as $CO_2$ binding in $CO_2$BOLs are described. A series of discoveries made at Pacific Northwest National Laboratory in Richland, Wash. USA by Vanda Glezakou, Roger Rousseau, and others have shown that single component $CO_2$-rich $CO_2$BOLs do not exist entirely as zwitterionic species but rather in a dynamic equilibrium between alkyl carbonic acid (the acid form [A]) and the zwitterion form [Z]. Tests performed on that zwitterion form revealed that various aspects of acid gas capture (and $CO_2$ capture specifically) by water-lean solvent systems can be controlled by deliberate molecular modifications. Specifically, it was found that close proximity of amine and alcohol moieties and tunable acid/base equilibria play important roles in determining $CO_2$ adsorption kinetics and bulk liquid viscosity.

The close proximity of the guanidine and alcohol moieties facilitates the concerted mechanism of $CO_2$ binding by the nucleophilic alcohol and concurrent proton transfer to the guanidine. The overall effect is fast $CO_2$ binding kinetics associated with low entropic contribution to the free energy barrier. This proximity also enables stronger internal H-bonding that favorably reduces viscosity. A high acidity at the alcohol site allows for a more efficient $CO_2$ activation at the transition state and an efficient proton transfer to the amine. In some embodiments non-charged $CO_2$ capture solvent systems obtained by adjusting the acid/base properties of the solvent molecules, so that a significant fraction of the $CO_2$-loaded molecules can exist in a partial or non-charged (acid) form may be preferable. This adjustment can be achieved by either increasing the acidity of the alcohol or by decreasing the basicity of the amine. Experiments have shown that non-charged $CO_2$ capture systems exhibit appreciably lower viscosities than the analogous zwitterionic form due to decreased ionic interactions. The guidelines outlined here for controlling $CO_2$ uptake kinetics and viscosity reduction can be ubiquitously applied to both carbonate and carbamate solvent systems.

This proximity also enables stronger internal H-bonding that favorably affects viscosity and assists in enabling acid gas bound moieties to be pumped from one location to another. In one set of experiments the presence of a high acidity at the alcohol site allows for a more efficient $CO_2$ activation at the transition state and an efficient proton transfer to the amine. This then leads to the concept that by adjusting the acid/base properties of the solvent molecules so as to obtain a charge neutral molecule rather than an ionic molecule as the art currently describes, that $CO_2$ capture systems that exhibit appreciably lower viscosities than the analogous zwitterionic forms could be designed.

Figure 1:
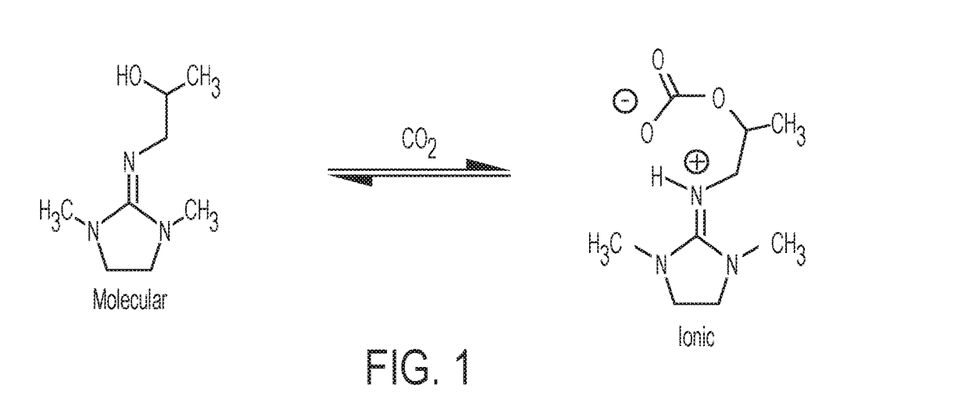
FIG. 1 shows an example of one exemplary embodiment of the invention.

Referring first to FIG. 1, an example of one exemplary embodiment of the invention is shown. FIG. 1 shows the methodology for the capture of an acid gas, in this case $CO_2$ by a binding organic liquid containing liquid. From experiments it has been shown that the acid gas binding free energy is one of the deciding criteria in the design of gas separation solvents. In this particular instance, the binding organic liquid has been designed with angles that allow for a closer hydrogen bonding proximity between the positive portion of the capture molecule and the negative portion of the bound $CO_2$ which results in reducing the charge on the zwitterion moving the molecule toward a charge neutral arrangement and a resulting desired lower viscosity because the individual molecules are structured in such a way so as to reduce agglomeration of $CO_2$-bound molecules. These lower viscosities in turn enable higher loadings of the bound $CO_2$, and flow and pumpability of the gas capture liquid to be maintained.

A series of simulations on various capture molecules (in this case $CO_2BOLs$) including IPADM-2-BOL, IPADM-3-BOL, IPATBM-2-BOL, and PADM-2-BOL showed that solvated $CO_2$ in the vicinity of the alcohol where the radial rC-O distances were less than 2.00 Å binds $CO_2$ in the form of an alkylcarbonate, while the H atom that originally belonged to the OH group remains on the guanidine N. For radial distances greater than 2.20 Å, 1-IPADM-2-BOL remains in its alcohol form, and $CO_2$ is mostly linear with the ∠OCO angle averaging ~175°. The angle decreases to ~165° for rC-O distances between 2.0 and 2.2 Å. $CO_2$ binding happens in an effectively concerted mechanism: at rC-O—2.00 Å, the ∠OCO angle decreases to ~165° for rC-O distances between 2.0 and 2.2 Å. $CO_2$ binding happens in an effectively concerted mechanism: at rC-O distances of ~2.00 Å, the ∠OCO angle becomes ~150° with a simultaneous H transfer to the nitrogen of the guanidine base. The $CO_2$ structure is consistent with a partial charge transfer to form a $CO_2$ (δ−) moiety and subsequent formation of a $CO_3$-moiety in the IPADM-2-BOL. This stronger hydrogen bonding, coupled with charge neutrality, contributes to a reduction in agglomeration in the acid gas rich environment. This reduction in agglomeration in turn results in overall reduced viscosity in the system. In other embodiments, viscosity is adjusted based upon monitoring the free energy profile (i.e., ΔG ([A]−[Z]) kJ/mol) and tuning the acid-base equilibria ($K_{eq}$=[A]/[Z]) between the solvated and bound $CO_2$ states.

The free energy profile for binding $CO_2$ to IPADM-2-BOL proceeds with a barrier of 16.5±1.2 kJ/mol and a binding free energy of −5.8±1.6 kJ/mol. The binding free energy is consistent with the experimentally obtained values for diazabicyclo[5.4.0]-undec-7-ene (DBU) containing dual-component $CO_2BOLs$ that range between −5.7 to −9.7 kJ/mol. This implies that at 40° C., there is an equilibrium between solvated and bound $CO_2$. The free energy barrier of 16.5 kJ/mol and the activation energy of 9.8 kJ/mol are compatible with the experimental observation that this process readily occurs at 40° C.

For aqueous monoethanolamine (MEA) capture liquids, the energy barrier is more than twice that of $CO_2BOLs$: density functional methods give a barrier of 35.5 kJ/mol for dry MEA, and from 16 kJ/mol up to ~63 kJ/mol for wet MEA; activation free energy estimates with the Arrhenius relation from experimental data are ~46.7 kJ/mol. An estimate of activation free energy is only ~7 kJ/mol higher than the activation energy, which is indicative of a small entropic contribution at the transition state, owing to the proximity of the acid/base moieties in the single component systems: unlike dual component systems, solvent re-organization at the transition state is not required. The relatively low barrier then suggests that capture in $CO_2BOLs$ is likely to be diffusion limited. Because the solvent viscosity increases exponentially with $CO_2$ loading, the capture rate will decrease as more $CO_2$ is added. These phenomena were observed when the $CO_2$ absorption rates of single and dual-component $CO_2BOL$ solvents where measured with wetted-wall experiments. These findings and understandings enable the design of liquid carbamates that will have increased $CO_2$ uptake capability, and enable the design of carbamate salts with decreased viscosities. By tuning the proximity of the alcohol and the amine so as to create structures that when bound to an acid gas have a preference for their own internal hydrogen bonding rather than agglomeration with other structures and creating molecules that are preferentially more charge neutral than ionic, the problems of high viscosity in an acid gas rich state as exists in other embodiments is reduced.

Inspired by these findings, single component amines (e.g., amino pyridines) with various pendant coordinating bases were designed to create structures having a high degree of internal hydrogen bonding and/or acid-base equilibria favoring the non-charged acid state (e.g., [1:1] acid [A]: zwitterion [Z] ratio) upon capture and binding of the acid gas in the bound material.

In one set of embodiments, modified $CO_2$ binding organic liquids with structures favoring internal hydrogen bonded species in the bound material were utilized that gave resulting viscosities that were reduced compared to those forming primarily zwitterionic species. For example a modified 1-IPADM-2-BOL was created that formed 34% internal (neutral charged) hydrogen bonded species and 66% external hydrogen bonded species that gave a resulting viscosity of ~110 (cP) at a $CO_2$ loading of 25 wt %.

In another set of embodiments, five modified $CO_2BOLs$ (1-MEIPADM-2-BOL, 1-IPADM-2-BOL, 1-IPADM-3-BOL, 1-IPATBM-2-BOL, PADM-2-BOL) were utilized. Table 1 lists fractions of internal hydrogen bonded species formed in these sorbent liquids at a $CO_2$ loading of 25 wt %.

TABLE 1

| $CO_2$ Binding Organic Liquid | Internal H-Bonded Species ($P_{int}$) | Viscosity (MD Simulation) (cP) | Viscosity (Experimental) (cP) |
|---|---|---|---|
| 1-MEIPADM-2-BOL | 52% | 114 | 75 |
| 1-IPADM-2-BOL | 34% | 149 | 171 |
| 1-IPADM-3-BOL | 21% | 190 | 270 |
| 1-IPATBM-2-BOL | 2% | 499 | Very viscous |
| 1-PADM-2-BOL | <1% | 950 | Solid |

As these data show, selecting or modifying structures of the sorbent liquid and/or tuning acid-base equilibria to obtain an increasing number of internal hydrogen-bonded species in the bound material reduces viscosity of these $CO_2$ binding organic liquids.

In another set of experiments, various $CO_2$ binding organic liquids were modified and tuned. The acid-base equilibria between the (solvated) organic acid and the conjugate base (i.e., bound $CO_2$ state) in the capture liquid were adjusted, decreasing the free energy profile, and increasing the number of charge neutral species that resulted in decreasing the viscosity in the resulting $CO_2$-bound material.

In one example, modified $CO_2$ binding organic liquids were created with reduced acidity of the pendant R-group of the coordinating base. A IPADM-2-BOL was modified by attaching an oxime moiety to the alcohol group of the coordinating base, reducing the free energy from 21.6 kJ/mol to −3.1 kJ/mol and tuning the acid-base equilibrium yielding a ratio of neutral-to-charged species (acid [A]: zwitterion [Z]) in the capture liquid from 1/4000 to 3/1 in the bound material. This resulted in lower viscosity and improved capture capacity.

In another set of embodiments, modified $CO_2$ binding organic liquids were utilized with structures modified to reduce basicity of the pyridine core, for example, by attaching acidic or electronegative moieties to the core structure.

A 1-IPADM-2-BOL was modified by attaching fluorine to the pyridine core reducing the free energy in the capture liquid from 21.6 kJ/mol to −5.4 kJ/mol and tuning the acid-base equilibrium yielding a ratio of neutral-to-charged species in the capture liquid from 1/4000 to 8/1 in the bound material, resulting in lower viscosity and improved capture capacity.

Figure 2:
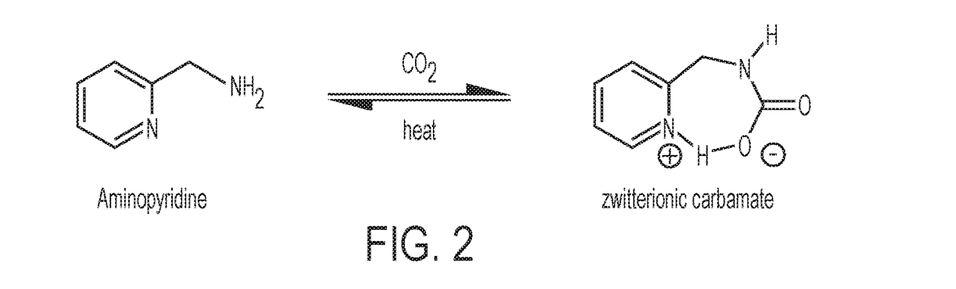
FIG. 2 shows an example of another embodiment of the invention
Figure 3A:
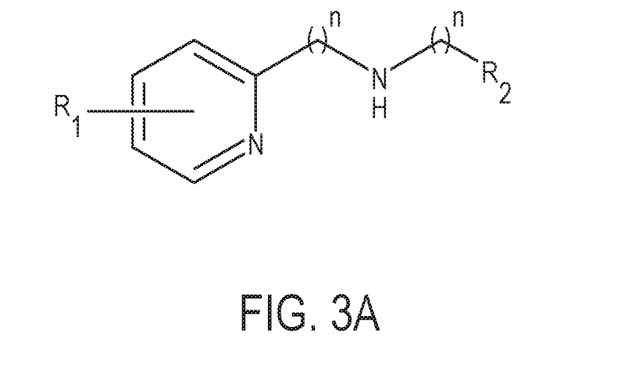
FIGS. 3A and 3B show the structures of various other embodiments of the invention.
Figure 3B:
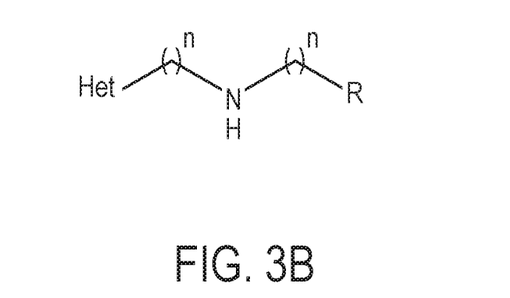

In another set of embodiments, a class of novel amino pyridine solvents was created. These non-aqueous amines demonstrated a high $CO_2$ capture capacity regeneration temperatures less than 100° C., durability for absorption and regeneration over multiple cycles without degradation, and a high water tolerance. The structures of various examples of these materials are shown in FIGS. 2-3.

In one set of embodiments, these amino pyridine solvents were created that were liquids at both $CO_2$ free and rich states, and were structurally predisposed to stabilize the incipient carbamic acid upon reaction with $CO_2$ through formation of stable 7 and 8 membered rings, respectively, via hydrogen bonding by the acidic proton and the 2-pyridine nitrogen. These solvents utilize the amine chemistry to bind $CO_2$ as carbamates, with internal hydrogen bonds that enable liquid products, thus allowing for water-free or -lean $CO_2$ capture liquids that otherwise would be unachievable under standard amine compositions of matter. These aminopyridine materials have unprecedented high $CO_2$ capture capacity ~20 wt %, with low regeneration energy. These amino pyridines form a new class of materials with potential applications in acid gas capture from flue gas of coal fired power plants, separation of acid gasses from natural gas streams and biogas, co-capture of acid gasses such as $CO_2$, $SO_2$, $CO_2$, $CS_2$ and $H_2S$, and other combinations of acid gasses from natural gas and biogas streams.

In one set of experiments six of these non-aqueous amine examples (2-MAMP, 3-MAMP, 4-MAMP, 2-EAMP, 4-EAMP, 2-MAEP) were shown to capture $CO_2$ with high capture capacity. All of these example compounds were liquids in the $CO_2$-rich state at room temperature, with a viscosity less than 300 cP at 40° C. Table 2 shows the $CO_2$ capture capacity at 25° C. of a set of six of these compounds. Table 3 shows the $CO_2$ capture capacity at 40° C. These results demonstrate that the $CO_2$ capture capabilities of these amine materials are approximately equivalent. The slight increase in capture capacity at 40° C. is due to a reduced viscosity due to the rise in temperature from the exothermic reaction of $CO_2$ with amines.

TABLE 2

| Compound | $CO_2$ Wt % | $CO_2$ Mol % |
| --- | --- | --- |
| 2-MAMP | 19.7 | 54.8 |
| 3-MAMP | 19.5 | 54.1 |
| 4-MAMP | 19.7 | 54.8 |
| 2-EAMP | 18.2 | 56.5 |
| 4-EAMP | 18.3 | 56.7 |
| 2-MAEP | 17.8 | 55.2 |

TABLE 3

| Compound | $CO_2$ Wt % | $CO_2$ Mol % |
| --- | --- | --- |
| 2-MAMP | 21.1 | 58.5 |
| 3-MAMP | 20.0 | 54.9 |
| 4-MAMP | 18.6 | 51.5 |
| 2-EAMP | 14.0 | 43.3 |
| 4-EAMP | 16.7 | 51.8 |
| 2-MAEP | 19.3 | 59.8 |

Figure 4:
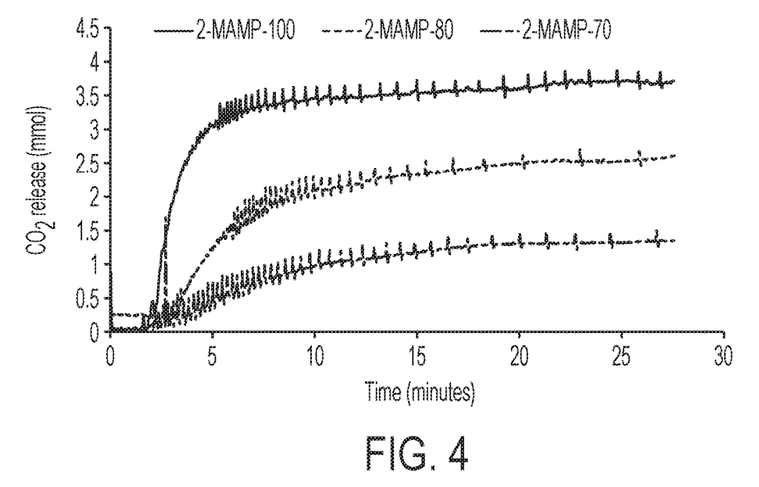
FIGS. 4 and 5 show the rates of $CO_2$ release and sorbent regeneration in various examples of the invention
Figure 5:
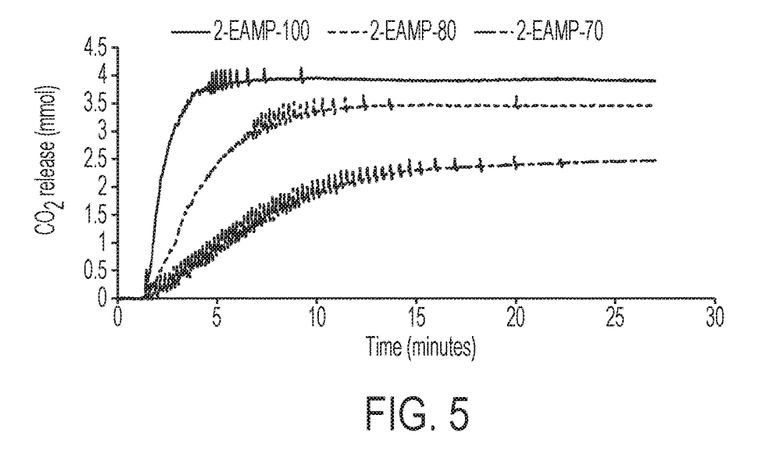
Figure 6:
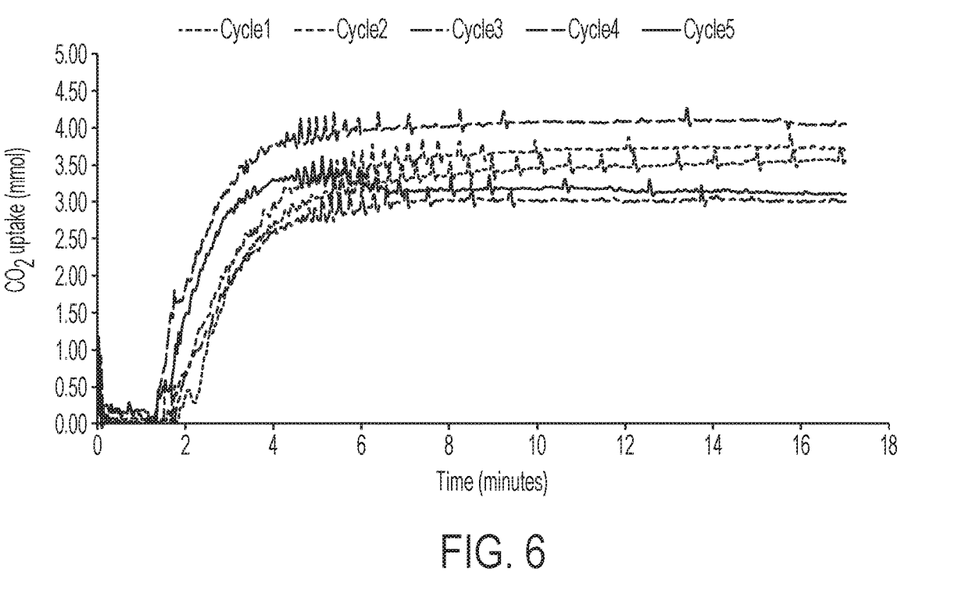
FIG. 6 shows the recyclability of one example of the present invention over several load and unload cycles.

After the $CO_2$ is captured and held by the compounds as zwitterionic carbamate salts under a first set of conditions, the carbamate salts can be subjected to a second set of conditions such as higher temperatures, a reduction in pressure, mixing with other materials, or other activities which will cause the bound $CO_2$ or other acid gas to be released and the underlying sorbent to be regenerated. Table 4 shows the results of a set of experiments performed on these same six compounds, wherein temperatures were raised and the percentage of $CO_2$ released was measured. These examples show that most of these amine based sorbent materials can be sufficiently regenerated at temperatures of 100° C., while 2-EAMP has a regeneration temperature of 80° C. The rates of regeneration of these various materials at various temperatures are shown in FIGS. 4 and 5. As these figures show, the rates of regeneration are relatively fast with most of these materials releasing the bulk of their captured $CO_2$ within 5 minutes. Some materials such as 2-EAMP can be completely stripped at a lower temperature (80° C.) in less than 10 minutes. In other embodiments other materials may release at different temperatures including lower temperatures.

TABLE 4

| Compound | 70° C. | 80° C. | 100° | 120° C. |
| --- | --- | --- | --- | --- |
| 2-MAMP | 33.8 | 60.5 | 90.3 | — |
| 3-MAMP | 31.1 | 51.0 | 77.5 | — |
| 4-MAMP | 35.1 | 51.3 | 93.8 | — |
| 2-EAMP | 85 | 95.8 | — | — |
| 4-EAMP | 71.4 | 85.1 | 98.8 | — |
| 2-MAEP | — | 34.6 | 76.4 | 90.3 |

In addition to acid gas release and regeneration of the solvent using changes in temperature, regeneration can be effectuated or supported using swings in pressure or polarity. In another set of experiments embodiments of water-lean solvents were constructed that would switch polarity upon binding with an acid gas such as $CO_2$. When subjected to an external induced polarity reduction these materials released the $CO_2$ and were regenerated to their prior form and were capable of reuse for acid gas capture. This process, named polarity swing assisted regeneration (PSAR), can be coupled with other methodologies for regeneration and enables for example the regeneration of materials at a lower temperature than would ordinarily be required or expected. In one set of experiments $CO_2$ rich 2-EAMP was able to be 81 percent stripped and regenerated at 60° C. using PSAR with decane as anti-solvent.

Experiments run on these amino pyridine compounds also demonstrated that over repeated cycles of $CO_2$ absorption at 25° C. and stripping and regeneration of the sorbent at 100° C. that the integrity of the underlying amino pyridine solvent remained intact with no signs of degradation. Furthermore, while viscosity increased with $CO_2$ loading, the viscosity of these amino pyridine compounds at lower temperatures generally remained at less than or equal to the viscosity of other compounds at higher temperatures (viscosity of 2-MAEP at 40° C. is nearly the same as viscosity of IPADM-2 BOL at 75° C.). Furthermore, the addition of up to 10 percent water to these liquids did not demonstrate any negative effect upon the $CO_2$ uptake and release. A mixture of $CO_2$ rich 2-MAMP with ten percent water remained a liquid with no precipitate, and maintained a bicarbonate-to-carbamate ratio of 5:4 per $^{13}C$ NMR analysis.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for capturing a target acid gas from a stream containing the target acid gas, the method comprising the step of:

contacting the stream with a gas selective capture sorbent comprising an amino pyridine having the structure wherein each of the n is greater than zero but less than or equal to 100, and R1 and R2 each include a hetero-alkyl group whereby the target acid gas reversibly binds to the gas selective capture sorbent to form a bound solvent sorbent that while bound under a first set of conditions, releases the target acid gas under a second set of conditions.

2. The method of claim 1 wherein R1 and R2 each include a hetero-alkyl group selected from OMe, OEt, OPr, OBu, Ot-Bu, N(Me)2, and N(Et)2.

* * * * *